United States Patent
Widger et al.

(10) Patent No.: US 10,589,214 B2
(45) Date of Patent: Mar. 17, 2020

(54) $CO_2$ MASS TRANSFER ENHANCEMENT OF AQUEOUS AMINE SOLVENTS BY PARTICLE ADDITIVES

(71) Applicant: University of Kentucky Research Foundation, Lexington, KY (US)

(72) Inventors: Leland R. Widger, Lexington, KY (US); Guojie Qi, Lexington, KY (US); Kun Liu, Lexington, KY (US); Jonathan Bryant, Lexington, KY (US); Cameron A. Lippert, Lexington, KY (US); Kunlei Liu, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 15/423,042

(22) Filed: Feb. 2, 2017

(65) Prior Publication Data

US 2017/0216763 A1 Aug. 3, 2017

Related U.S. Application Data

(60) Provisional application No. 62/290,293, filed on Feb. 2, 2016.

(51) Int. Cl.
*B01D 53/78* (2006.01)
*B01D 53/14* (2006.01)
(Continued)

(52) U.S. Cl.
CPC ..... *B01D 53/1475* (2013.01); *B01D 53/1425* (2013.01); *B01D 53/1493* (2013.01); *B01D 53/62* (2013.01); *B01D 53/78* (2013.01); *B01D 2252/202* (2013.01); *B01D 2252/2041* (2013.01); *B01D 2252/20405* (2013.01);
(Continued)

(58) Field of Classification Search
None
See application file for complete search history.

(56) References Cited

U.S. PATENT DOCUMENTS

| 5,100,633 A | 3/1992 | Morrison |
| 5,895,634 A | 4/1999 | Mitsuoka et al. |

(Continued)

FOREIGN PATENT DOCUMENTS

| JP | 49118695 A | 11/1974 |
| JP | H05231 A | 1/1993 |

(Continued)

OTHER PUBLICATIONS

Chingombe et al., "Surface modification and characterization of a coal-based activated carbon." Carbon, vol. 43 (2005), pp. 3132-3143.*

(Continued)

*Primary Examiner* — Daniel Berns
(74) *Attorney, Agent, or Firm* — King & Schickli, PLLC

(57) ABSTRACT

The present invention relates to methods for improving carbon capture by providing particles within an amine solvent. The particles provide for increased turbulence at the interface between the counter-flowing gas and solvent, which allows for increased amine and carbamate salt diffusion between the liquid film and bulk.

10 Claims, 20 Drawing Sheets

(51) Int. Cl.
*B01D 53/62* (2006.01)
*B01D 53/96* (2006.01)

(52) U.S. Cl.
CPC ............ *B01D 2252/20421* (2013.01); *B01D 2252/20431* (2013.01); *B01D 2252/20447* (2013.01); *B01D 2252/20484* (2013.01); *B01D 2252/20489* (2013.01); *B01D 2252/60* (2013.01)

(56) References Cited

U.S. PATENT DOCUMENTS

| | | |
|---|---|---|
| 6,966,942 B2 | 11/2005 | Broadbent |
| 7,842,126 B1 | 11/2010 | Dilmore et al. |
| 8,137,444 B2 | 3/2012 | Farsad et al. |
| 8,318,116 B2 | 11/2012 | Hu |
| 8,329,459 B2 | 12/2012 | Parent et al. |
| 8,501,125 B2 | 8/2013 | Vandor |
| 8,846,377 B2 | 9/2014 | Fradette et al. |
| 8,864,876 B2 | 10/2014 | Neumann et al. |
| 9,114,350 B2 | 8/2015 | Liu et al. |
| 2002/0162454 A1 | 11/2002 | Hu |
| 2003/0154858 A1* | 8/2003 | Kleut ..................... B01D 53/04 95/133 |
| 2004/0228788 A1 | 11/2004 | Nagai et al. |
| 2009/0027827 A1* | 1/2009 | Siggel ..................... H01G 9/038 361/502 |
| 2010/0226841 A1 | 9/2010 | Thiele et al. |
| 2013/0202517 A1 | 8/2013 | Ayala et al. |
| 2015/0014182 A1 | 1/2015 | Park et al. |

FOREIGN PATENT DOCUMENTS

| | | |
|---|---|---|
| WO | WO03008071 A1 | 1/2003 |
| WO | WO2014005226 A1 | 1/2014 |

OTHER PUBLICATIONS

Teng et al., "Viscosity of Aqueous Solutions of N-Methyldiethanolamine and of Diethanolamine." J. Chem. Eng. Data (1994), vol. 39, pp. 290-293.*
English machine translation of JPH05231A.
English machine translation of JP49118695A—Abstract only available.

* cited by examiner

CO₂ MASS TRANSFER ENHANCEMENT OF AQUEOUS AMINE SOLVENTS BY PARTICLE ADDITIVES

RELATED APPLICATIONS

This application claims priority to U.S. Provisional Patent Application 62/290,293, filed Feb. 2, 2016, which is hereby incorporated by reference it its entirety.

GOVERNMENT SUPPORT

This invention was made with Government support under grant DE-FE0007741 awarded by the Department for Energy. The Government has certain rights in the invention.

TECHNICAL FIELD

The present invention relates generally to particle additives in $CO_2$ amine scrubbing solutions and the enhanced $CO_2$ capture provided by such.

BACKGROUND

Aqueous amine based post-combustion $CO_2$ capture is one of the most commonly employed practices for $CO_2$ removal from coal-fired combustion power plants. Extensive efforts have been carried out to seek or develop new amine solvents with the goal of improving $CO_2$ absorption efficiency with lower energy costs. A variety of aqueous amine solutions have been identified as potential $CO_2$ capture solvents, such as monoethanolamine (MEA), N-methyldiethanolamine (MDEA), piperzine (PZ) and 1,6-hexanediamine (HDA) in water. In an amine-based capture process, two equivalents of amine react with the $CO_2$ in the absorber to form one equivalent of carbamate and/or bicarbonate and one equivalent of protonated amine. This ion pair is then regenerated in the stripping process, to release a pure stream of $CO_2$ for compression and two equivalents of amine that are recycled to the absorber (FIG. 1).

The absorption rates for $CO_2$ capture are dependent on kinetics, where faster solvents all for a decrease in the size of the absorber. However, faster solvents will often bind more strongly with $CO_2$, and the regeneration of the carbamate will require more energy in the stripping tower. Even for MEA, PZ, and HDA, as fast kinetic solvents, the cost of capturing $CO_2$ from flue gas of coal combustion is expected to increase the energy consumption by approximately 30%-40%.

Extensive studies have identified solvent improvement as a key point of the energy saving target. One approach is to blend secondary and/or tertiary amines into the aqueous primary amine to improve the rate of $CO_2$ absorption while maintaining high, capacity and reduced energy costs for $CO_2$ removal. However, the potential for in-situ nitrosation of secondary amines by flue gas contaminates (e.g. NO/NO₂) to form nitrosamines raises environmental health and safety concerns. Another approach is using enzymes, such as carbonic anhydrases, to enhance the mass transfer by catalyzing the $CO_2$ hydration reaction in alkali salt or tertiary amine solvents. However, enzymes are not likely to survive in the high stripping temperatures (above 100° C.) required for post-combustion $CO_2$ capture. These limitations in the use of secondary and tertiary amines and enzymes prompted investigation into using particles to improve the $CO_2$ capture efficiency of aqueous primary amines.

SUMMARY OF THE INVENTION

The present invention provides methods for increasing carbon capture from a gas. The methods include contacting the gas with a biphasic scrubbing solution. The biphasic scrubbing solution comprises an amine solvent with particles suspended therein. In certain embodiments, the particles have a width of less than about 500 microns. In further embodiments, the particles are hydrophobic. In even further embodiments, the particles are comprised of activated carbon particles. In yet further embodiments, In instances where the particles comprise activated carbon, a surface of the activated carbon particles may be functionalized, such as by oxidation. The activated carbon particles may also be functionalized by appending of a functional group to the particle. Examples of appended groups include an alcohol, a primary amine, a tertiary amine, and an amino silane.

With regard to size, in some embodiments the particles may possess a width of between about 0.1 and 500 microns. In other embodiments, the particles have a width of less than 100 nanometers. In yet further embodiments, the particles may comprise a mixture of particles with an average width of about 0.1 to 500 micros and particles with a width of less than 100 nanometers.

The choice of amine solvent may be selected from those currently utilized in carbon capture systems. For example, the amine solvent may be monoethanolamine (MEA), hexanediamine (HDA), N,N-Bis(2-hydroxyethyl)methylamine (MDEA), piperazine (PZ) or 2-amino-2-methyl propanol (AMP).

Within the amine solvent, the particles may comprise between about 0.5 to 3 percent by weight of the biphasic scrubbing solution. The corresponding amine may be dissolved in water to achieve about 15 to about 50 weight percent of the amine solvent. The amine solvent has a viscosity of between about 3 to about 10 cP.

In certain embodiments, the biphasic solution counterflows against the gas flow. The contacting between the biphasic solution and the gas allows a liquid film forms at the interface of the gas flow and the biphasic solution. The presence of the particles increases amine and carbamate salt diffusion from the liquid film.

DETAILED DESCRIPTION

Figure 1:
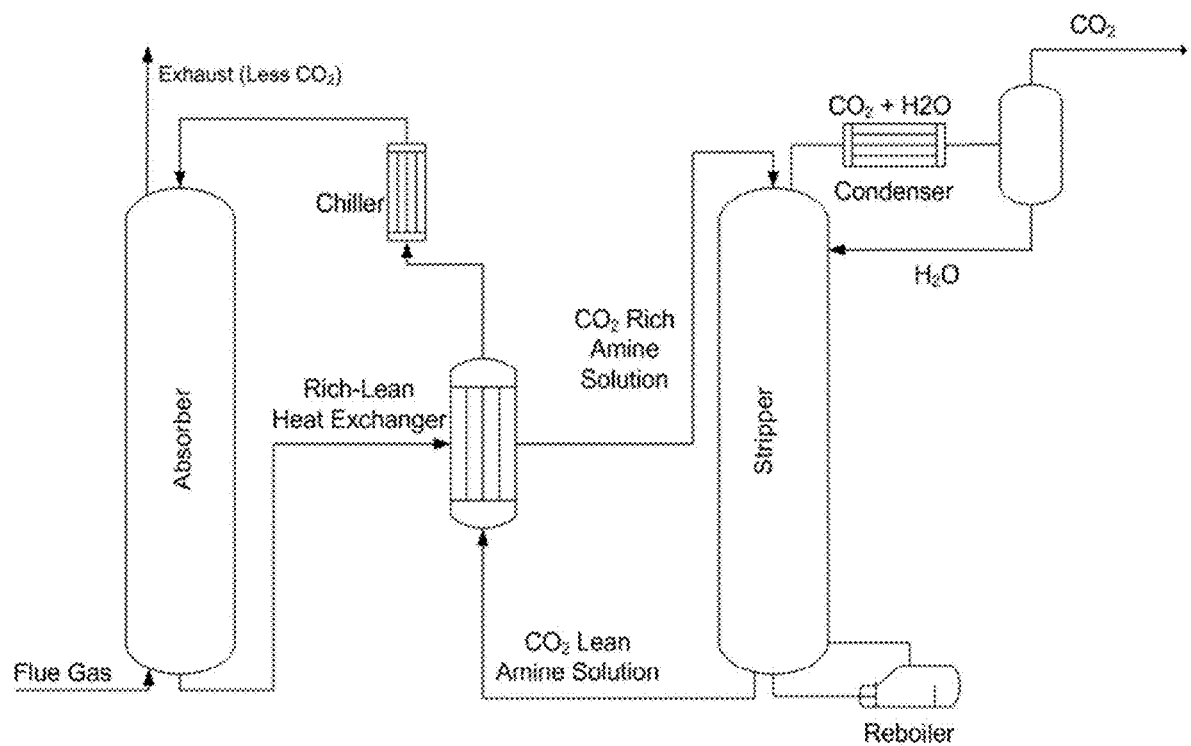
FIG. 1 shows a carbon capture process schematic.
Figure 2:
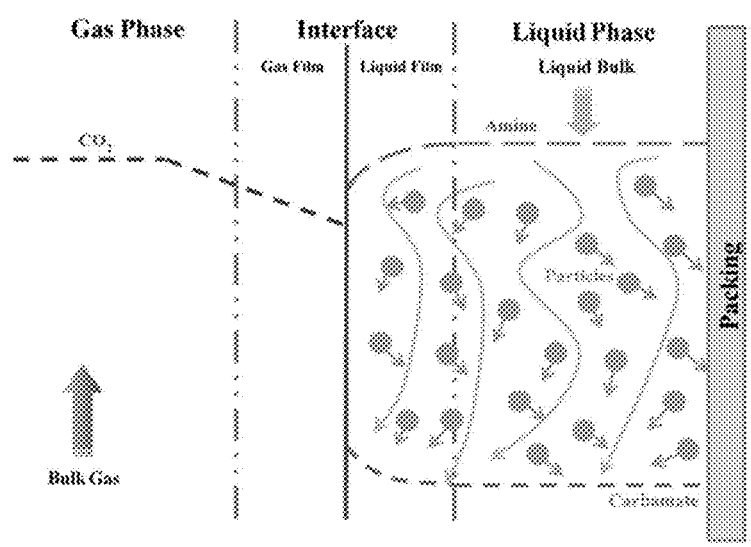
FIG. 2 shows two-film theory based particle enhancement on $CO_2$ mass transfer.

Recent studies show that for amine solvents, especially those with fast $CO_2$ absorption kinetics, mass transfer is limited by diffusion of $CO_2$ molecules from the liquid film into the bulk liquid as shown in FIG. 2. The mass transfer ($k_g$) of $CO_2$ absorption from the gas phase into the liquid is governed by two terms in equation 1, reaction resistance and diffusion resistance. A reduction in the diffusion resistance can therefore increase the overall mass transfer rate. Herein are presented approaches for increasing macro/micro-turbulence in the liquid film that provide increased and effective diffusion of $CO_2$ into the bulk solvent. Small scale solid particles were selected as an additive to create turbulence in the liquid phase. Based on the two film theory, $CO_2$ gas molecules are absorbed into solution at the interface, and react with fresh amine to form carbamate salt in the liquid film. In a system without particles (FIG. 1A), fresh amine and the carbamate salt will slowly diffuse between the liquid film and bulk phases, while in a system with particles (FIG. 1B) the turbulent mixing increases amine and carbamate salt diffusion between the liquid film and bulk.

$$\frac{1}{k'_g} = \frac{\sqrt{Dk_2[M]}}{H} + \frac{1}{k^\circ_{L,prod}} \frac{\Delta P^*_{CO_2}}{\Delta \alpha \cdot [M]} \quad (1)$$

The few reported studies on the use of solid additives in solvent based $CO_2$ capture focused on inorganic oxide particles in kinetically slow solvents such as $K_2CO_3$ and MDEA. These systems have limited benefit from enhanced diffusion and fail to meet the expectations for $CO_2$ capture cost and performance.

The effect of particle additives on $CO_2$ mass transfer enhancement was first determined in a stirred reactor apparatus, a lab-scale test with a flat gas-liquid interface. These initial studies revealed activated carbon as the most effective solid additive. Subsequent scale-up testing was conducted on a mini-scrubber system as set forth below. This scaled-down model of an absorber column allowed for verification and quantification of the contribution of particles on improving $CO_2$ physical diffusion in solvents with fast kinetics under dynamic conditions that approximate industrial conditions. This represents the first example where small-scale solid additives have been shown to enhance $CO_2$ mass transfer in fast kinetic amine solvents. These results represent an opportunity for significant cost savings for $CO_2$ capture.

Activated carbon (AC) particles can thus be provided with amine solvent solutions to improve $CO_2$ capture, such as in a carbon capture (CC) apparatus.

In some embodiments, the surface of activated carbon particles are functionalized. Functionalization is to provide a more positive zeta potential in order to improve carbon capture. Table 1 sets forth various ways in which the surface of AC particles can be functionalized. The following are exemplary approaches to functionalizing the AC particles. For nitric acid oxidized ("N-Ox") functionalized activated carbon, particles can be suspended in concentrated nitric acid, heated to reflux, then collected by filtration and washed. For sulfuric acid oxidized ("S-Ox") functionalized activated carbon, particles can suspended in concentrated sulfuric acid, heated to reflux, then collected by filtration and washed. For oven oxidized ("Oven-Ox") functionalized activated carbon, particles can be subjected to high temperature for days, such as e.g., placed in a 310° C. oven for 72 h (referred to herein as Oven-Ox-Ac).

Alcohol/primary amine/tertiary amine appended activated carbon particles can be prepared by dissolving dicyclohexylcarbodiimide (DCC) in a minimum amount of $CH_2Cl_2$, and adding to a suspension of Oven-Ox-AC in $CH_2Cl_2$. The corresponding amine arm can then be added, allowed to stir, then collected and washed. Quaternary Amine functionalized activated carbon particles can be prepared by suspending tertiary amine AC in tetrahydrofuran (THF) under inert atmosphere, $CH_3I$ added and then sealed, stirred, collected and washed. Amino silane ("Si—$NH_2$") functionalized activated carbon particles can be prepared by mixing tri(methoxy)aminosilane, ethanol, and nitric acid in a volumetric ratio of 1:20:1 and then soaking activated carbon particles in the mixture. Those skilled in the art will appreciate that more than one type of functionalized AC particle can be used in assisting with $CO_2$ capture.

In some embodiments, the selected AC particles have a micron size, with a scale width range of less than 500 microns, such as between about 50 to 500 microns. In other embodiments, the AC particles have a nano size, with a scale width range of less than 100 nanometers. In yet further embodiments, the AC particles may be mixtures of both nano and micron sized AC particles.

Figure 11:
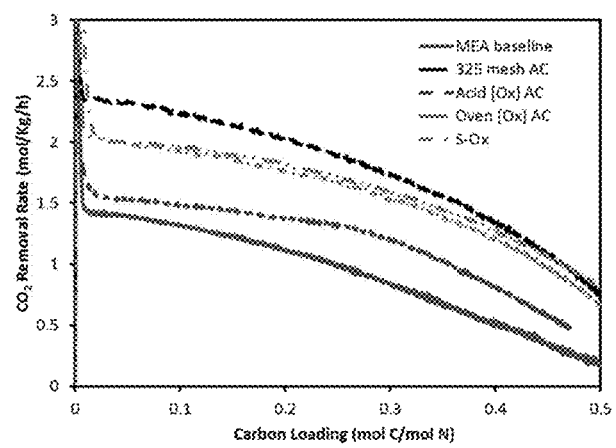
FIG. 11 shows functionalized Particles (1 wt. %) for enhancing mass transfer of $CO_2$ into 5 M MEA, in the Stir Reactor apparatus. Left=oxidized particles, Right=amine functionalized particles.
Figure 11:
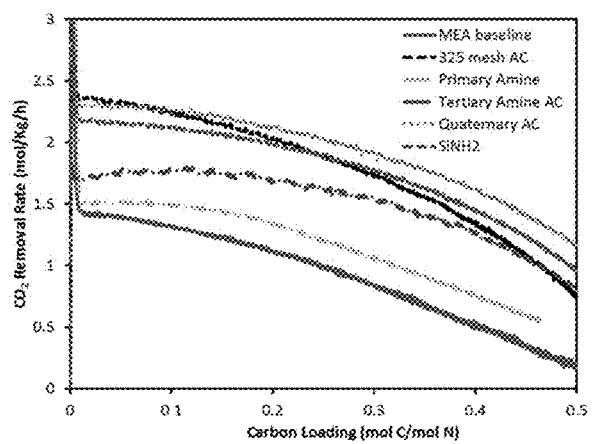
Figure 12:
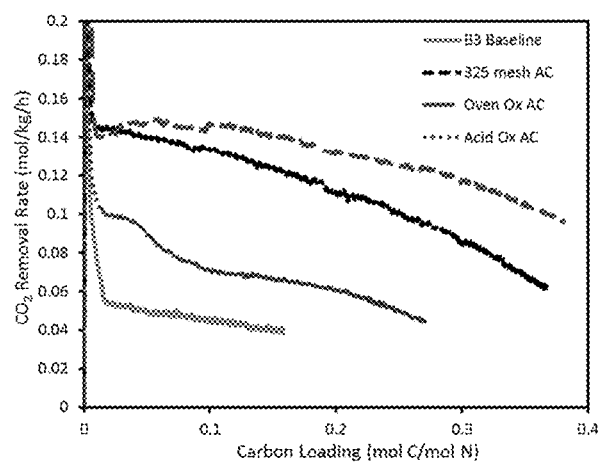
FIG. 12 shows functionalized Particles (1 wt. %) for enhancing mass transfer into A2P/AMP, in the Stir Reactor apparatus. Left=oxidized particles, Right=amine functionalized particles.
Figure 12:
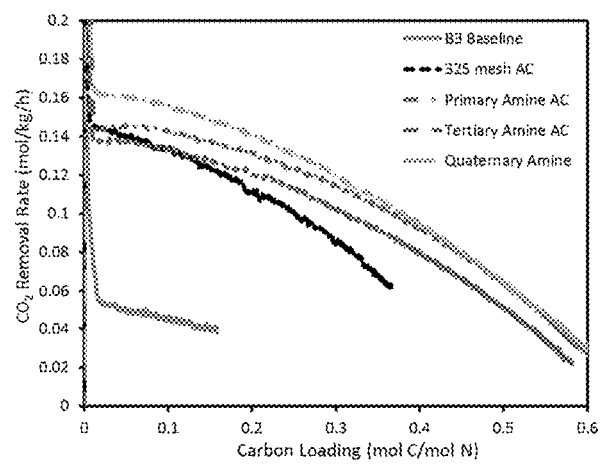

The use of micron-sized particles as a solvent-additive increases mass transfer of $CO_2$ into amine-based carbon capture and storage (CCS) solvents, and the effect of particle surface functionalization on the degree of mass transfer enhancement has been examined. The mass transfer data was primarily collected in the stirred-reactor apparatus, with a flat gas-liquid interface, to simulate stable film formation on the packing material. The series of surface-modified particles were tested in order to improve mass transfer enhancement in both monoethanolamine (MEA) (FIG. 11) and 1-amino-2-propanol/2-amino-2-methyl-1-propanol (A2P/AMP) (FIG. 12).

Figure 13:
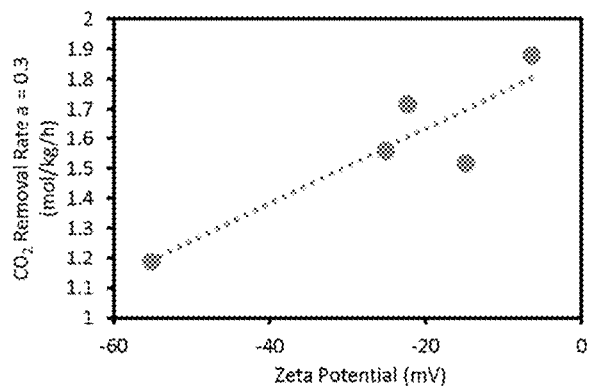
FIG. 13 shows top: Zeta potential (left) and surface pKa (right) versus initial $CO_2$ removal rate of surface-modified solid additives (1 wt. %) in 5 M MEA. Bottom: Zeta potential versus $CO_2$ removal rate in A2P/AMP.
Figure 13:
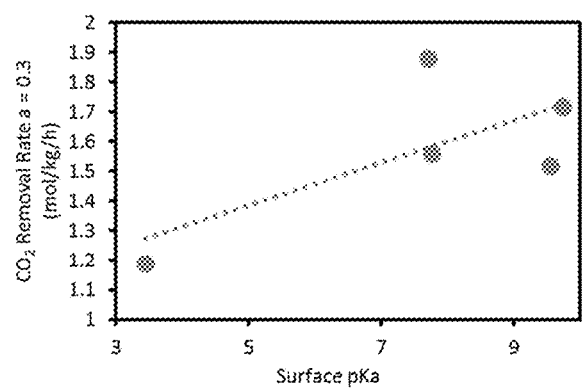
Figure 13:
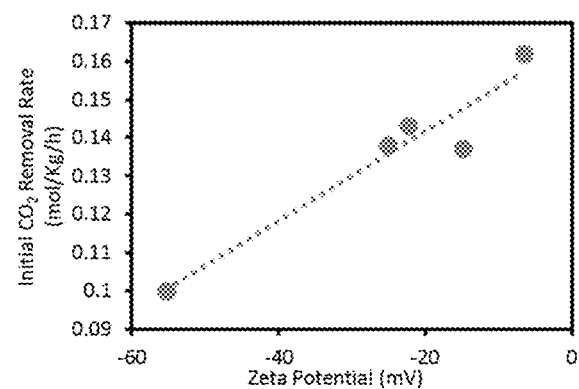
Figure 14:
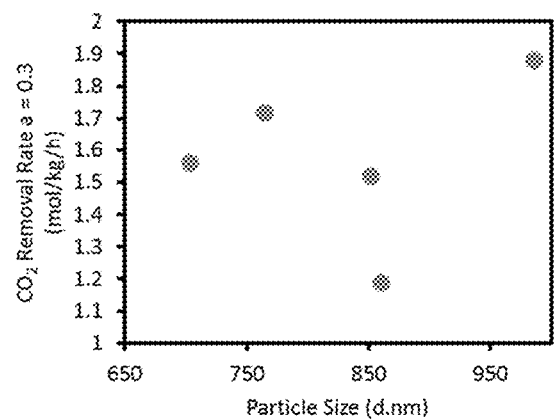
FIG. 14 shows the relationship between $CO_2$ removal rate and particle size (right), and Zeta potential and particle size (left).
Figure 14:
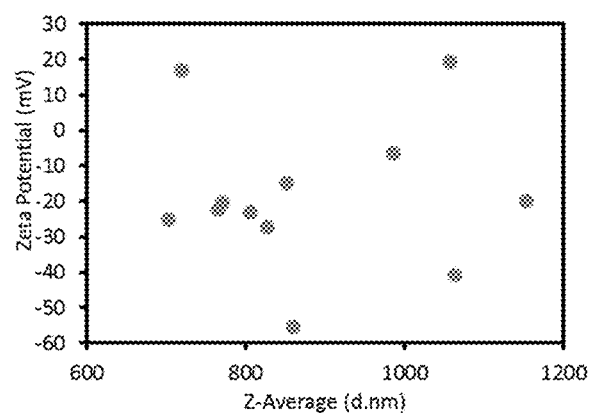
Figure 15:
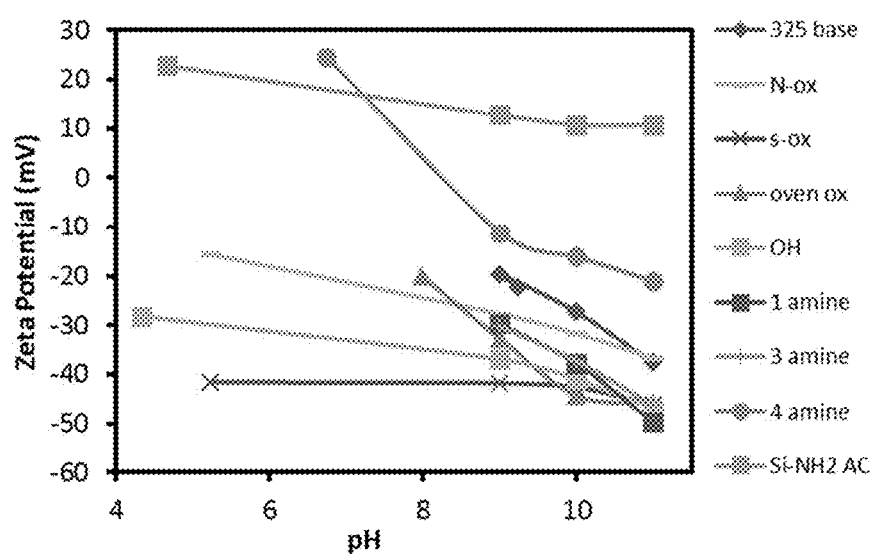
FIG. 15 shows pH dependent zeta potential values for surface-modified activated carbon particles.

The surface properties of the particles were characterized (Table 1), and analyzed to determine a structure/function relationship. As with most aspects of these complex CCS solvent systems, there isn't a direct correlation between any one property and increased mass transfer, but we did observe a couple general trends. As shown in FIG. 13, it appears that in general, higher zeta potential, and surface pKa, are associated with greater mass transfer. This initial series of surface functionalization is clearly not exhaustive, and any number of additional functionalization are obviously possible. Interestingly, no relationship was observed between particle size, as measured by dynamic light scattering, and enhancement in mass transfer, or any relationship between zeta potential and particle size (from electrostatic aggregation), see FIG. 14. However, as shown in FIG. 15, the zeta potential of these particle additives is pH-dependent and varies widely over the operating range of the CCS process.

Figure 16:
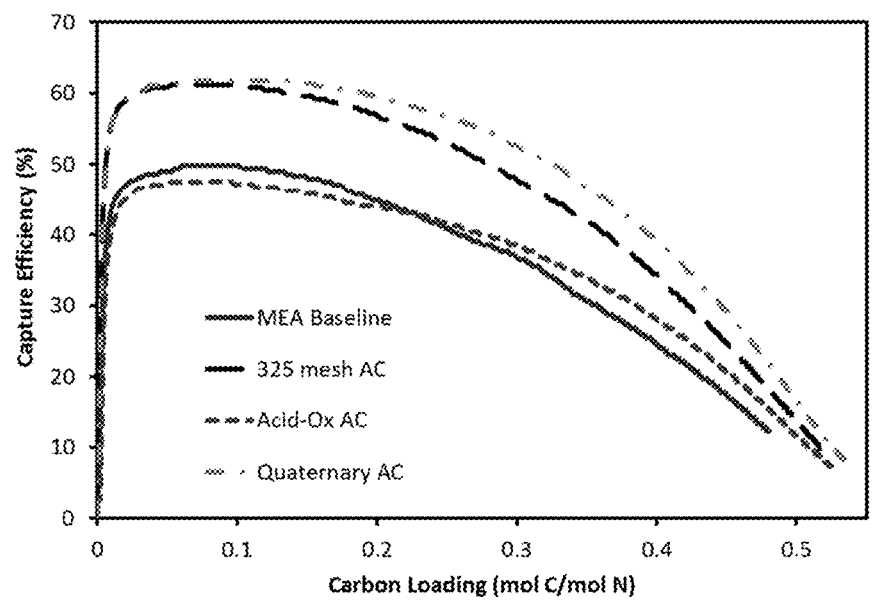
FIG. 16 shows mini-scrubber data showing the effect of particle additives on capture efficiency in 30 wt. % MEA.

Experiments under packed-column conditions are also critical to demonstrate the potential of particle additives. It is common for enhancements observed in lab scale experiments to be diminished in a packed column, or under process conditions, as additional competing variables are added. However, FIG. 16 clearly shows a conservation of the general trend, consistent with the stirred reactor data, where the addition of particles to the solvent enhances capture efficiency. In addition, Table 2 summarizes heat-integrated absorption/stripping experiments that show an overall decrease in energy penalty of the A2P/AMP+1 solvent blend upon the addition of the particle additive. This decrease is due to increased absorber efficiency with the particle additive, which translates to a 10% increase in the carbon loading of the rich solvent and allowing for operation of the stripper at lower temperature.

TABLE 1

Surface properties and initial removal rate (5 M MEA) of surface-modified additives for enhancing mass transfer into amine-based CCS solvents.

| Additive Functionalization | Base Sites (mmol/g) | Acid Sites (mmol/g) | Surface pKa | Zeta Potential (mV) | Particle Size (d · nm) | $\alpha = 0.3$, $CO_2$ Removal Rate (MEA) |
|---|---|---|---|---|---|---|
| 325 mesh AC | 0.68 | 0.28 | 9.74 | −22.3 | 764.2 | 1.72 |
| N—O$x$ | 0 | 1.7 | 3.45 | −55.3 | 859.9 | 1.19 |
| S—OX | 0 | 2.9 | 2.6 | −40.8 | 1063 | 1.51 |
| Oven O$_x$ | 0.61 | 0.4 | 7.76 | −25.1 | 702.9 | 1.56 |
| Alcohol | 0.73 | 0.23 | 9.17 | | | |
| Primary Amine | 0.76 | 0.32 | 9.55 | | | 1.03 |
| Tertiary Amine | 0.88 | 0.3 | 9.55 | −14.9 | 851 | 1.52 |
| Quaternary Ammonium | 0.71 | 0.42 | 7.705 | −6.49 | 985 | 1.88 |
| Tertiary Amine (From N—O$x$) | 0.89 | 0.82 | 9.54 | | | |
| Si—NH$_2$ | | | | 19.3 | 1057 | 1.77 |

TABLE 2

Reaction conditions and energy demand for $CO_2$ capture in Bench Unit for different solvents.

| SOLVENT | Energy Demand (kJ/mol $CO_2$) | Capture Efficiency (%) | Stripper Pressure (kPaa) | Cyclic Capacity (mol $CO_2$/kg) | Solvent Flowrate (mL/min) |
|---|---|---|---|---|---|
| MEA[16] | 234 | 92 | 110 | 0.84 | 150 |
| A2P/AMP[16] | 236 | 92 | 128 | 0.72 | 150 |
| A2P/AMP + 1[16] | 187 | 89 | 179 | 1.37 | 60 |
| A2P/AMP + 1 + 325 AC | 169 | 90 | 122 | 1.10 | 90 |

| Solvent | Rich Loading (mol $CO_2$/kg) | Lean Loading (mol $CO_2$/kg) | Reboiler T (° C.) | $Q_R$ (kW) | Rich Viscosity (cP) |
|---|---|---|---|---|---|
| MEA[16] | 2.51 | 1.67 | 92 | 0.72 | 3.3 |
| A2P/AMP[16] | 2.00 | 1.28 | 91 | 0.72 | 7.2 |
| A2P/AMP + 1[16] | 2.08 | 0.707 | 106 | 0.52 | 7.4 |
| A2P/AMP + 1 + 325 AC | 2.27 | 1.17 | 99 | 0.50 | 7.5 |

Figure 17:
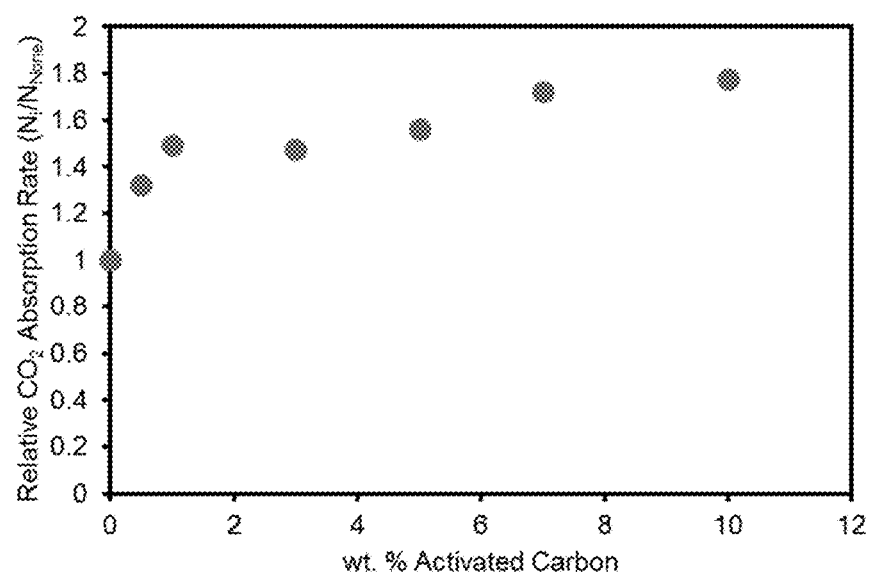
FIG. 17 shows the effect of activated carbon loading on enhancement of $CO_2$ absorption by stir reactor analysis.
Figure 18:
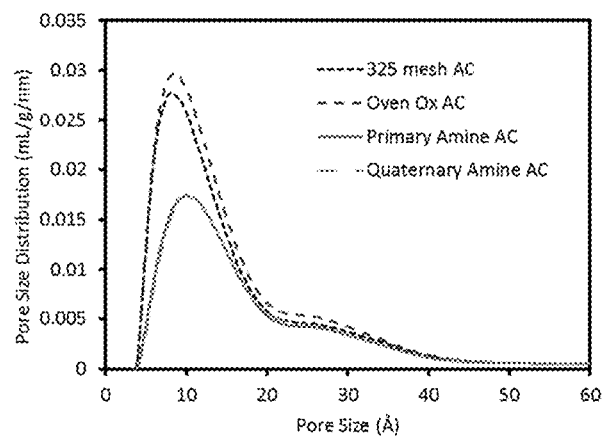
FIG. 18 shows BET characterization of surface area and pore volume for activated carbon particles.
Figure 18:
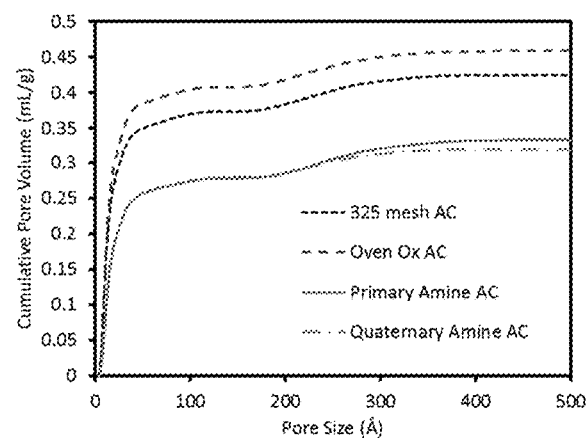
Figure 19:
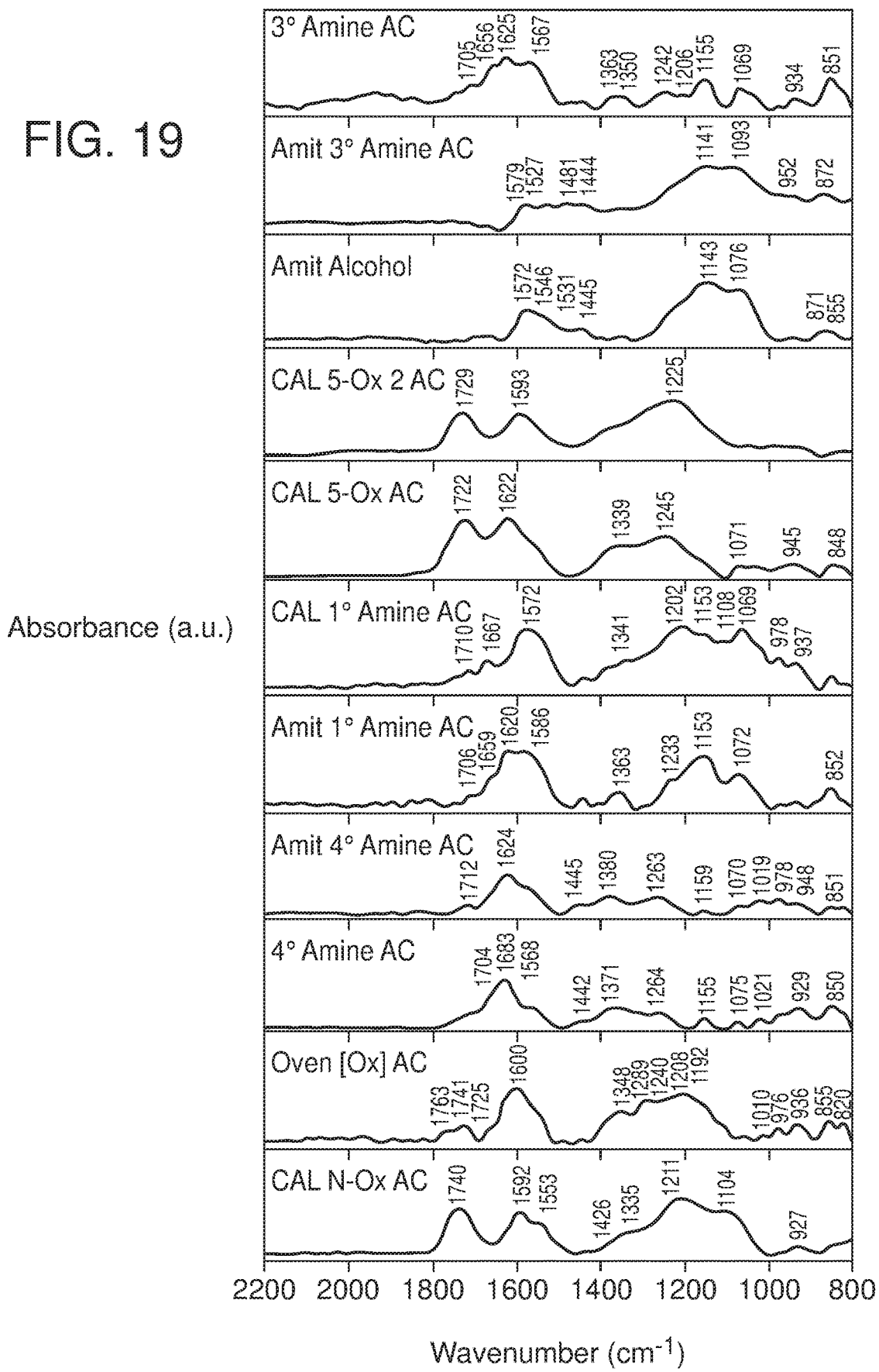
FIG. 19 shows infrared spectroscopy of surface-modified activated carbon particles.
Figure 20:
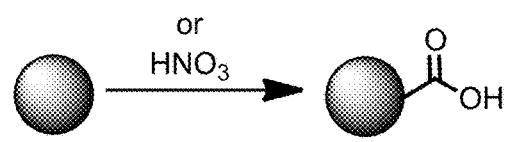
FIG. 20 shows a schematic of the steps to append amines to particles.
Figure 20:
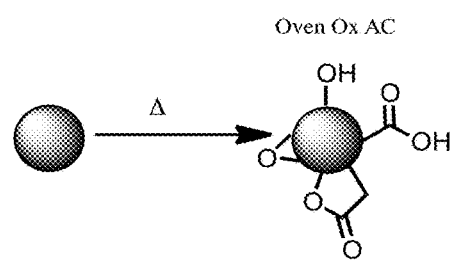
Figure 20:
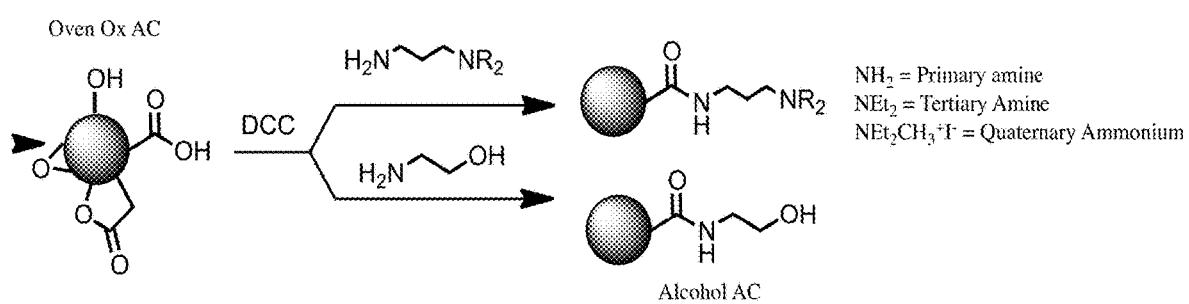

Also provided herein are biphasic solutions comprising activated carbon particles suspended in an amine solvent. Examples of amine solvents include monoethanolamine (MEA), hexanediamine (HDA), N,N-Bis(2-hydroxyethyl) methyl-amine (MDEA), piperazine (PZ) and 2-amino-2-methyl propanol (AMP). In order to determine the ideal loading, or wt. %, of particle additives to incorporate into the solvent, several factors need to be considered. FIG. 17 shows the relative $CO_2$ absorption rate in the stirred reactor apparatus for varying particle loadings. In addition to the enhancement obtained, the cost of the additive, slurry viscosity, and process/transport complications need to be considered as well. In balancing these additional factors, a particle loading of between 1-1.5 wt. % particles can be of practical value. Increasing to 1.5-2 wt. % particles is also feasible, as is allowing for above 2 wt. % up to about 3% unless process modifications are made to accommodate high levels of particulate additives in the solvent.

Further embodiments also include a carbon capture system comprised of a stripper, the stripper containing the described biphasic solution of amine solvents with AC particles suspended therein.

EXAMPLES

Example 1

1. Materials

The carbon dioxide (>99.9%) and span gas (14 vol %, $CO_2$, in $N_2$) were purchased from Purity Plus. Particles were purchased from the vendors as detailed in Table 3. Aqueous amine solvents were prepared from high purity of MEA, 2-amino-2-methyl-1-propanol (AMP), methyldiethanolamine (MDEA), and piperazine (PZ) and 1,6-hexanediamine (HDA), as summarized in Table 2, with deionized water. The particle additives were added into the MEA, MDEA, PZ and HDA aqueous amine solutions and then ultrasonicated for 60 seconds to disperse the particles.

TABLE 3

Particle additives summary

| Particle type | Vendor | Size | Purity |
| --- | --- | --- | --- |
| Activated carbon (micro) | Fisher Scientific | 74-297 μm | ≥99% |
| Activated carbon (nano) | US Research Nano-materials, Inc. | <100 nm | >95% |
| Amino silica | Sigma-Aldrich | 40-63 μm | ≥99% |
| Carbon black | Fisher Scientific | ~42 nm | >99.9% |
| Silica gel | Sigma-Aldrich | 35-70 μm | ≥99% |

TABLE 4

Amine chemicals summary

| Amine type | Vendor | Purity | Targeted concentration |
| --- | --- | --- | --- |
| AMP | Fisher Scientific | ≥95% | 44.5 wt. % |
| HDA | Sigma-Aldrich | ≥70% | 30 wt. % |
| MEA | Univar | >99% | 30 wt. % |
| MDEA | Sigma-Aldrich | ≥99% | 30 wt. % |
| PZ | Sigma-Aldrich | >99% | 15 wt. % |

2.2 Experimental

2.2.1 Stirred Reactor Setup

Figure 3:
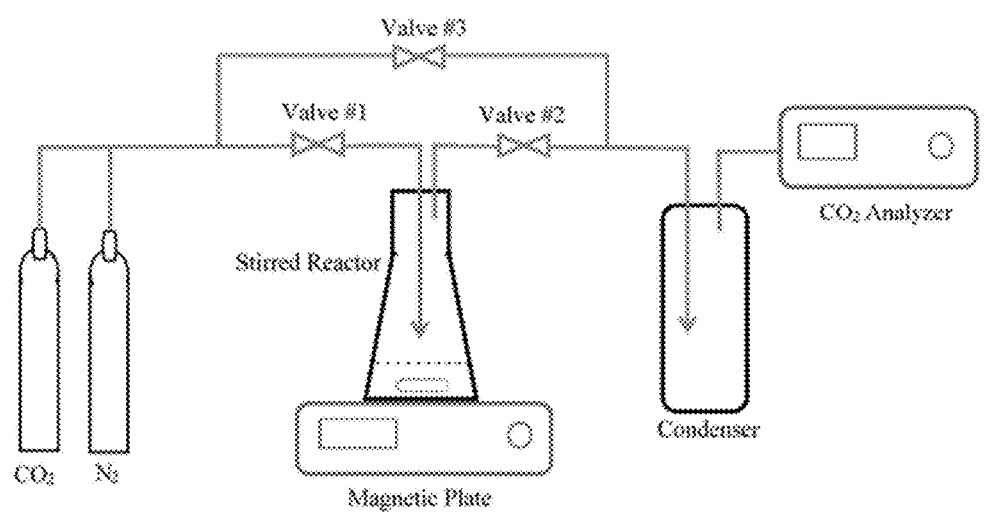
FIG. 3 shows a schematic of stirred reactor experimental apparatus.

A stirred reactor apparatus was employed to determine the impact of small scale particles on $CO_2$ mass transfer (FIG. 3). In a typical experiment, 75 mL of solvent was added to a 250 ml Erlenmyer flask equipped with a stir bar at room temperature (21.5° C.). Particle additives were added into the solvent at a 1 wt. % loading (750 mg). The stir rate was set to 150 rpm in order to maintain particle suspension with moderate turbulence and a flat gas liquid interface. The mixed $CO_2$ and $N_2$ gas (0.1 L/min $CO_2$ and 0.75 L/min $N_2$, 11.8 vol. % $CO_2$) is injected into the reaction vessel via an inlet tube directly above the liquid surface. The reactor outlet gas flow is dried using silica gel and analyzed for $CO_2$ concentration using a Horiba VIA-510 analyzer. Data of outlet $CO_2$ concentration is continuously recorded every 1 second. The procedure for [$CO_2$] data acquisition and calculation of $CO_2$ loading and absorption rate have been previously reported.

2.2.2 Mini-Scrubber Setup

Figure 4:
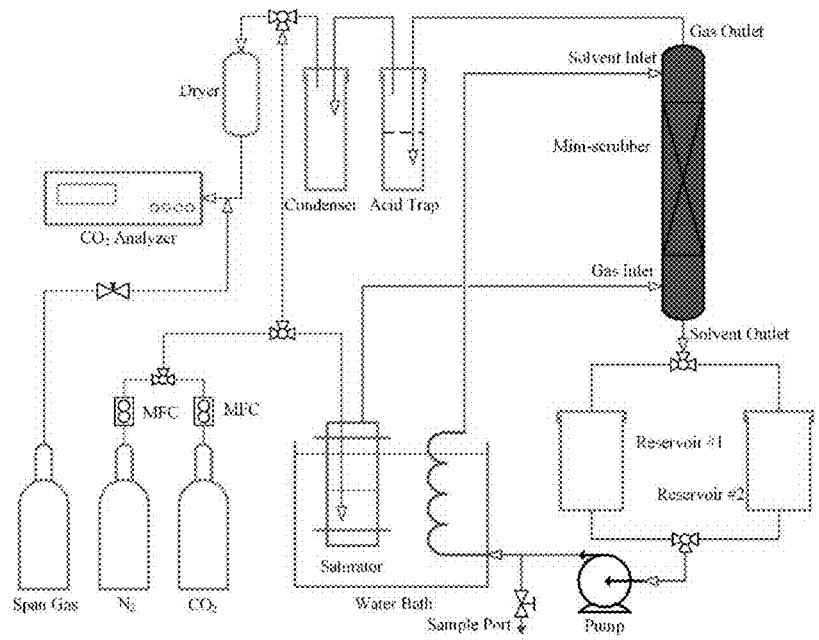
FIG. 4 shows a schematic of mini-scrubber setup.

In this work, the mini-scrubber experiments were conducted using the proprietary solvent CAER-S2, in order to determine $CO_2$ mass transfer. A schematic of the mini-scrubber apparatus is shown in FIG. 4, where the left side is the absorption column and the right side is the stripper. For this work, absorption tests were conducted at 40° C. using 30 wt % CAER-S2 solvent. The solvent (600 mL) was added to the reservoirs and pumped into the top of the column at 150 mL/min. Simulated flue gas (14% $CO_2$ in $N_2$) was flowed into the bottom of the column to give counter-current flow between the gas and liquid. For each run, or single pass through the column, the solvent was collected in the empty reservoir (see FIG. 4), and a sample is collected before being circulated back through the column. The total carbon loading, pH, and total alkalinity for samples collected in each steady state were measured to describe the $CO_2$ capture performance. The $CO_2$ capture rate at steady state for each run was calculated based on the continuous data acquisition of outlet and inlet gas phase $CO_2$ concentration. The overall mass transfer coefficient ($K_{Ga}$) was calculated from the slope of the mass transfer rate vs the log mean pressure difference.

3.1 Initial Screening of Particle Additives in Stirred Reactor

It is well known that the liquid side resistance in the carbon capture process consists of diffusion resistance and reaction resistance.

$$R_{Overall} = R_{gas} + R_{reaction} + R_{diffusion} \quad (2)$$

It was then postulated that the addition of solid particles to carbon capture solutions could reduce the diffusion resistance in the liquid film and facilitate an increase in overall $CO_2$ mass transfer.

Figure 5:
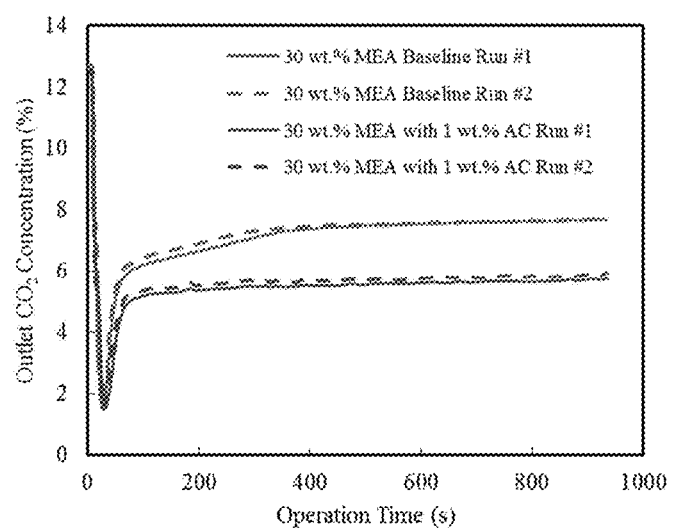
FIG. 5 shows $CO_2$ absorption rate versus $CO_2$ loading in 30 wt. % MEA at room temperature.

All experimental data is compared to the reference solvent, 5M (30 wt. %) MEA. FIG. 5 shows the output of a stir reactor experiment with both a 30 wt. % MEA baseline, with no additive, and a 30 wt. % MEA with 1 wt. % added activated carbon. Outlet $CO_2$ concentration is measured over time, in which, a lower value for outlet $CO_2$ concentration is indicative of more efficient initial $CO_2$ absorption. These data show that solutions with activated carbon solid additives are more efficient at removing $CO_2$ from the gas phase, likely due to lower diffusion resistance in the capture solution.

Figure 6:
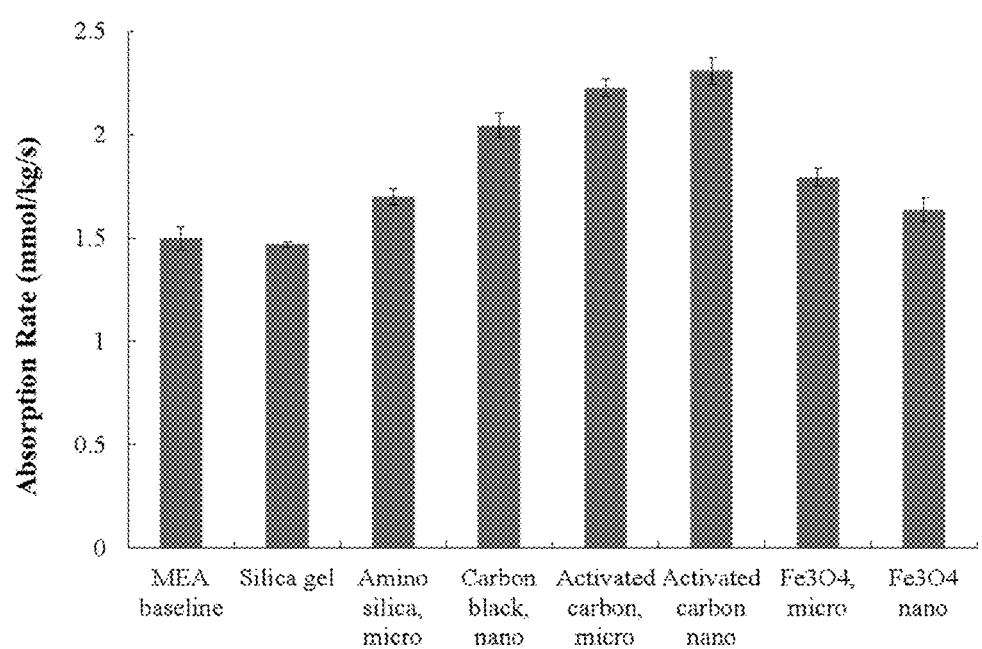
FIG. 6 shows a comparison of $CO_2$ absorption rate between different small scale particles in the stirred reactor with flat gas-liquid interface, silica gel (36-74 μm); amino silica (40-63 μm); carbon black (42 nm); activated carbon micro (74-297 μm); activated carbon nano (50-200 nm); Fe₃O₄ micro (44 μm); Fe₃O₄ nano (20-50 nm) in 5 M MEA at 1 wt % loading.

With the initial concept verified, preliminary screening on a variety of particles in order was conducted to identify a readily available and cost effective additive that would give the best overall performance. The stirred reactor experiments were used for initial screening as a lab scale approximation of the solvent behavior on the packing material microenvironment, with a flat gas-liquid interface. The tests were performed at room temperature with 14% $CO_2$ simulated flue gas being absorbed by 30 wt % monoethanolamine (MEA), which is widely used as a baseline solvent for $CO_2$ capture. FIG. 6 presents the initial absorption rate for blank MEA and MEA with five types of particle additives including silica, amino functionalized silica, carbon black, microscale activated carbon (AC), and nano-scale AC all at 1 wt % of solid additive. The results show that all of the particles tested, with the exception of silica gel, effectively promote $CO_2$ absorption in the stirred reactor. The best performing particles were AC and carbon black with improvements of 45, 51, and 55% for the carbon black, micro AC, and nano AC respectively.

The silica particles are more hydrophilic in nature than the carbon-based particles. The unfunctionalized silica do not exhibit any mass transfer enhancement, within the experimental error, however the presence of amine surface groups in the amino functionalized silica particle shows a small amount of enhancement to the initial absorption rates. This result suggests that surface functionalization can tune the effectiveness of the particles additives in order to achieve the desired enhancement and solvent interactions. Current research is underway toward the feasibility of advanced functionalized particles for use as additives in carbon capture systems.

3.2 Activated Carbon Enhancement in Varied Amines in Stirred Reactor

Figure 7:
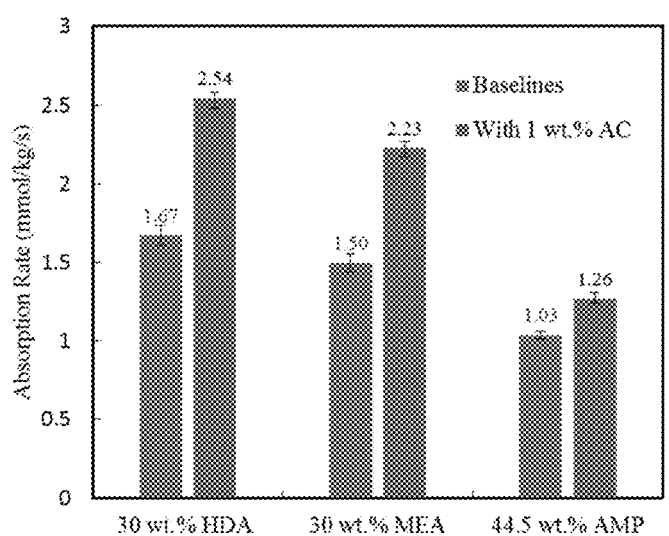
FIG. 7 shows a comparison of initial $CO_2$ absorption rate between different amine solvents with 1 wt. % activated carbon in the stirred reactor with flat gas-liquid interface.

Based on the promotion of overall mass transfer in the baseline MEA solvent, steps were followed to investigate the effect of activated carbon particles on $CO_2$ absorption performance in different amine solvents commonly used in carbon capture processes. Activated carbon particles were further tested in the stirred reactor with x M (30 wt. %) hexanediamine (HDA) and y M (44.5 wt. %) 2-amino-2-methyl propanol (AMP). The data, as shown in FIG. 7, indicates that the initial $CO_2$ absorption rates can be enhanced by the AC in all solvents tested. Due to the different reaction rates, we compared the percent enhancement in initial $CO_2$ absorption rate of solvent with particles to the particle free solvent. The improvement upon addition of AC particles is greater in 30 wt. % HDA (52% increase) than either 30 wt. % MEA (33%) or 44.5% AMP (18%) (Table 5).

TABLE 5

Enhancement in initial $CO_2$ absorption rate upon the addition of 1 wt. % activated carbon particles in different CCS solvents, as measured by stirred-reactor.

| Solvent | Enhancement in Initial $CO_2$ Absorption Rate (%) |
| --- | --- |
| 30 wt % MEA | 33 |
| 30 wt % HDA | 52 |
| 44.5 wt % AMP | 18 |

It is interesting to note that the observed mass transfer improvement in 44.5 wt. % AMP, a more diffusion-controlled solvent, is dramatically less than seen for either HDA or MEA. Solvent viscosity is an important variable in the liquid side resistance toward mass transfer, and the viscosity is significantly higher in AMP solutions (Table 6). The viscosity of the initial solvents was determined to be 3.88 cP for HDA, 3.05 cP for MEA, and 10.93 cP for AMP at x ° C. Therefore, the least viscous solvent (MEA) gives a mid-range enhancement, while HDA gives the greatest enhancement. The viscosity of AMP is much higher than either MEA or HDA, and exhibits the least percent enhancement from micro-mechanical mixing. It is likely that the degree of enhancement from the addition of solid particles increases with increasing viscosity, up to a point where the mixing from particles is no longer sufficient to overcome resistance from the high viscosity.

TABLE 6

Viscosities of CCS solvent mixtures

| Amine | Viscosity (cP) |
| --- | --- |
| 30 wt % MEA | 3.05 |
| 30 wt % HDA | 3.88 |
| 44.5 wt % AMP | 10.93 |

3.3 Enhancement of $CO_2$ Absorption in Various Amine Solvents in the Mini-Scrubber Lab-scale (stirred reactor) testing of different solid additives identified activated carbon particles as the most effective for mass transfer enhancement of $CO_2$ absorption into amine solvents. AC particles were selected for further testing under more process-relevant conditions using our mini-scrubber apparatus. The mini-scrubber apparatus is a packed (1.5" i.d.×22" high) column that simulates absorber conditions on a small scale. 74-297 μm and 50-200 nm activated carbon particles were utilized with a liquid flow rate of 150 mL/min and gas flow rate of 16.9 mL/min (14% $CO_2$ in $N_2$). The activated carbon concentration was 1 wt. % in 1.2 L of the amine solvent. Prior to loading the solvent into the apparatus, the solvent/particle suspension was placed in an ultrasonic bath for 30 minutes to fully disperse the particles.

Figure 8:
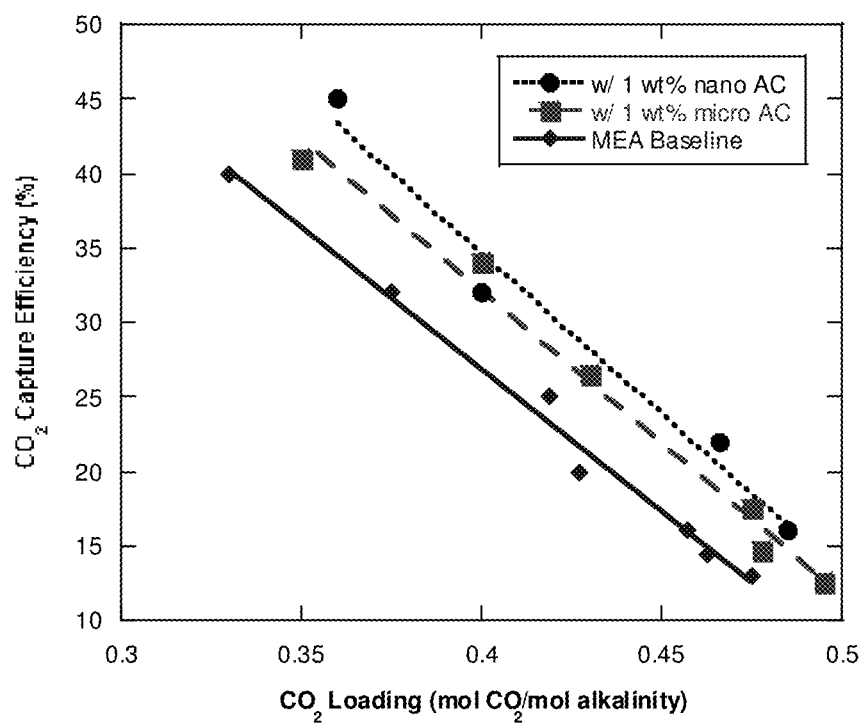
FIG. 8 shows $CO_2$ capture efficiency comparison between 30 wt % MEA baseline (blue), with 1 wt % nanoscale activated carbon particles (50-200 nm; black), and with 1 wt % microscale activated carbon particles (75-250 μm; green).

The $CO_2$ mass transfer is increased by the addition of either micro or nanoscale activated carbon particles to 30 wt % MEA solvent, FIG. 8. This increased $CO_2$ absorption efficiency upon addition of AC particles is observed over the entire $CO_2$ loading range of α=x mol C/mol N to α=y mol C/mol N, operational range of absorption towers. Particularly, the micro and nanoscale activated carbon can gain 17% and 20% $CO_2$ mass transfer enhancement, respectively, at $CO_2$ loadings of α=0.4 mol C/mol N, which is the targeted α for the absorption tower.

Figure 9:
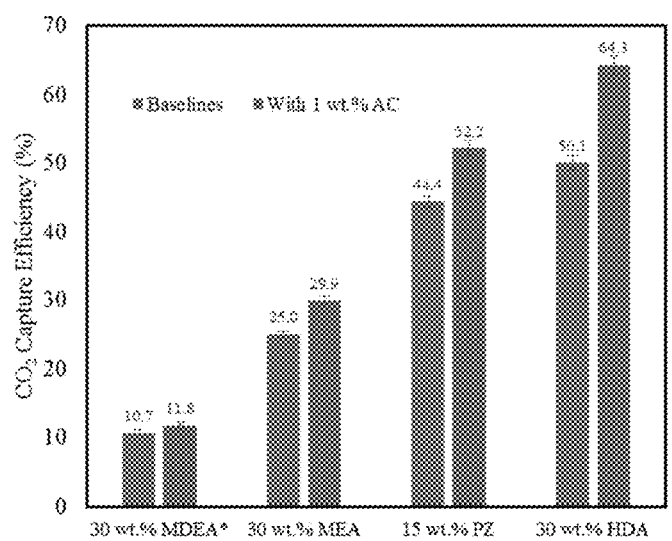
FIG. 9 shows $CO_2$ capture efficiency comparison in different amine solvents with same driving force.
Figure 10:
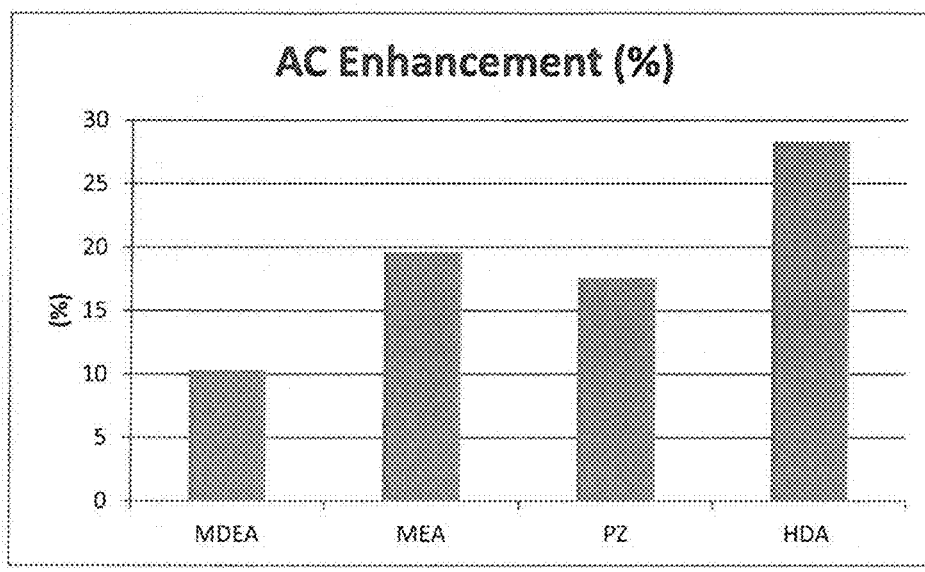
FIG. 10 the percentage increase in $CO_2$ capture efficiency for 4 amine solvents (values given in FIG. 9 are used).

The overall capture efficiency of a solvent is affected by both the overall mass transfer coefficient and the driving force. The effect of adding AC particles on the overall mass transfer coefficient in various amine solvents was obtained by holding the mass transfer driving force constant. Vapor liquid equilibrium (VLE) data of $CO_2$ in MEA, HDA, PZ and MDEA solvents was used to obtain the $CO_2$ loading at a $CO_2$ partial pressure of 1 kPa. Holding the $CO_2$ partial pressure constant ensures a constant driving force, which for 30 wt. % MEA, 30 wt. % HDA, 2 M PZ, and 2 M MDEA results in a carbon loading of 0.41, 0.4, 0.31, and 0.15 mol C/mol N respectively. It should be noted that the concentration of 2 M PZ and 2 M MDEA solvents are close to the concentrations used in the particle evaluation tests (15 wt % PZ and 30 wt % MDEA). The resulting change in the $CO_2$ capture efficiency at a constant driving force was obtained for the four solvents, as shown in FIG. 9. The $CO_2$ capture efficiency enhancement by AC particles is shown in FIG. 10 for 30 wt % MEA, 30 wt %, HDA, 15 wt % PZ, and 30 wt % MDEA respectively. These results show that AC particles have a larger enhancement on $CO_2$ absorption in more diffusion-controlled solvents with faster kinetics (HDA) compared to solvents with more kinetic control (MDEA).

TABLE 7

VLE loading of carbon capture solvents with a $CO_2$ partial pressure of 1.0 kPa

| Amine | C/N |
|---|---|
| 5M MEA | 0.41 |
| 30 wt % HDA | 0.40 |
| 2M PZ | 0.31 |
| 2M MDEA | 0.15 |

4. Conclusion

The addition of small-scale solid particles to amine-based carbon capture solvents, effectively promotes mass transfer of $CO_2$ into the solvent phase. Lab scale stirred reactor experiments indicate that upon identification of activated carbon as the most effective particle tested, we conducted testing in the mini-scrubber apparatus, a packed column experiment that more closely replicates absorber conditions. Testing a variety of solvents showed that the addition of particles promoted mass transfer to varying degrees, and that the micromechanical mixing of particles is most effective in diffusion controlled solvents with fast kinetics such as piperzine and hexanediamine.

Example 2

Recent work has focused on chemical and physical strategies for increasing mass transfer of $CO_2$ from coal-derived flue gas into amine-based solvents for carbon capture processes. The goal of these studies is two-fold: 1) to increase absorption kinetics, which would decrease the size of the absorber tower (~30% of the overall capital cost of a CCS unit); and 2) increase the obtainable rich loading of the solvent in order to decrease the regeneration energy of the solvent at a given cyclic capacity. The nature of an industrial CCS process complicates these seemingly simple goals, as physical and process conditions seem to place inherent limits on improvements. For example, it is well known that higher carbon loadings are associated with increased viscosity of the capture solvent, and that increasing solvent viscosity results in a dramatic decrease in mass transfer of $CO_2$ (g) into the liquid phase. We have therefore been working toward the development of a biphasic solvent; that incorporates solid additives to increase mechanical mixing within the solvent (FIG. 1).

The purpose of the solid particles is to mix the solvent film on the packing material, bring fresh solvent to the gas/liquid interface, prevent/disturb the formation of stable films, and counteract viscosity increases.

Key Findings

Smaller particles (nano & 325 mesh) allow for smoother process operation and have added benefit of better performance.

Mini scrubber and bench unit studies with 325 mesh particles show evidence of mass transfer improvement on the mini scrubber, and up to 25% decrease in overall energy penalty on the bench unit! *These preliminary studies should still be repeated & verified.

B. Approach

Steps have been taken toward the development of a solid additive solvent by conducting labscale experiments in order to identify particles that are the most effective at enhancing mass transfer of $CO_2$ into carbon capture solvents. The lab-scale stirred reactor apparatus (FIG. 2) allows for rapid screening of a variety of particles, in an environment that approximates stable film formation on the packing material microenvironment. These experiments allow for a lead particle to be selected before scale-up testing on the mini-scrubber (FIG. 2) or bench unit.

C. Experimental

Stirred Reactor.

A stirred reactor apparatus was employed to determine the impact of small scale particles on $CO_2$ mass transfer. A schematic of this apparatus is shown in FIG. 2. In a typical experiment, 75 mL of solvent was added to a 250 ml Erlenmyer flask equipped with a stir bar at room temperature (21.5° C.). The stir rate was set to 150 rpm, in order to maintain particle suspension and moderate turbulence. The stirred reactor with solvent has flat gas liquid interface, and the mixed $CO_2$ and $N_2$ gas (0.75 L/min N2 and 0.1 L/min $CO_2$) is injected into the reaction vessel via an inlet tube above the interface and blows the liquid surface. The reactor outlet gas flow is dried and analyzed for $CO_2$ concentration. Data of outlet $CO_2$ concentration with respect to time is continuously recorded with 1 second interval. The $CO_2$ concentration data acquisition and the calculation of $CO_2$ loading and absorption rate procedure are previously reported.

Mini Scrubber.

A schematic of the mini-scrubber apparatus is shown in FIG. 2, where the left side is the absorption column and the right side is the stripper. For this work, absorption tests were conducted at 40° C. using 30 wt % CAER-S2 solvent. The solvent (600 mL) was added to the reservoirs and circulated in the mini-scrubber at 150 mL/min, while simulated flue gas (14% $CO_2$ in $N_2$) was flowed into the mini-scrubber at the bottom and passed counter-currently with the solvent. For each run, or single pass through the column, the solvent was collected in the alternate reservoir (see FIG. 2), and a sample is collected before being circulated back through the column. The total carbon loading, pH and total alkalinity for samples collected in each steady state were measured to describe the $CO_2$ capture performance. The $CO_2$ capture rate at steady state for each run was calculated based on the continuous data acquisition of outlet and inlet gas phase $CO_2$ concentration. The overall mass transfer coefficient (KGa) was calculated based on the $CO_2$ mass transfer rate, and the log mean pressure difference. The slope of the mass transfer rate as a function of the log mean pressure difference yields a value for KGa.

A total of 16 runs were conducted in each solvent tests to achieve the determination of $CO_2$ absorption at different $CO_2$ loading. The samples at different $CO_2$ loading were collected for the $CO_2$ loading, alkalinity and viscosity tests. The sample test method was same as that used in the WWC test was described in previous CMRG quarterly reports.

Bench Unit.

The measurements of $CO_2$ absorption efficiency and rich solution regeneration energy requirement at various conditions were performed during the bench-scale parametric study. The $CO_2$ absorption efficiency in absorber is related to the gas inlet and outlet $CO_2$ flow rates by Eq. (3):

$$\varphi_{CO_2} = \frac{n_{CO_2}^{in} - n_{CO_2}^{out}}{n_{CO_2}^{in}} \quad (3)$$

where $\varphi_{CO_2}$, $CO_2$ capture efficiency, %; $n_{CO_2}^{in}$, gas inlet $CO_2$ mole flow rate, mol/s; $n_{CO_2}^{out}$, gas outlet $CO_2$ mole flow rate, mol/s. The inlet $CO_2$ flow rate, $n_{CO_2}^{in}$ could be calculated by the $CO_2$ MFC flow rate directly. The outlet $CO_2$ flow rate was calculated by Eq. (4):

$$n_{CO_2}^{out} = C_{CO_2}^{out} \frac{V_{N_2}^{in}}{1 - C_{CO_2}^{out}} \quad (4)$$

where $C_{CO_2}^{out}$, outlet $CO_2$ concentration, %; $V_{N_2}^{in}$, inlet $N_2$ flow rate, L/min. the outlet $CO_2$ concentration, $C_{CO_2}^{out}$ was measured by the Horiba $CO_2$ analyzer, which was calibrated in each parametric test. The inlet $N_2$ flow rate, $V_{N_2}^{in}$ was obtained from the MFC. The rich $CO_2$ solution regeneration energy is related to the energy supplied to the system (reboiler and vacuum pump duty) and heat loss, which could be determined by Eq. (5):

$$Q_{CO_2}^{ov} = \frac{Q_R + Q_V - Q_{HL}}{n_{CO_2}^{in} - n_{CO_2}^{out}} \quad (5)$$

where $Q_{CO_2}^{ov}$, overall regeneration energy per unit of $CO_2$ regeneration, kJ/mol $CO_2$; $Q_R$, reboiler heat duty, kW; $Q_V$, corrected vacuum pump duty, kW; $Q_{HL}$, heat loss, kW. The reboiler heat was provided by hot oil recirculation, the heat duty $Q_R$ could be calculated by Eq. (6):

$$Q_R = C_p^{oil} m_{oil} \rho_{oil} (T_R^{in} - T_R^{out}) \quad (6)$$

where $C_p^{oil}$, hot oil heat capacity, kJ/g/K; $m_{oil}$, hot oil flow rate, L/s; $\rho_{oil}$, hot oil density, g/L; $T_R^{in}$, reboiler inlet oil temperature, °C.; $T_R^{oil}$, reboiler outlet oil temperature, °C. The Mobiltherm 603 hot transfer oil was used in the reboiler system. The vacuum pump duty $Q_V$ was recorded by an Acuvim Power Meter and corrected according to $CO_2$ released from stripper. The overall system heat loss was estimated by 0.09 kW. All the parametric tests were performed at least 4 hours nearly steady-state operation and duplicated at least once to verify the experimental consistency. The average of all the monitored parameters in the nearly steady-state operation range, such as $CO_2$ concentration, temperature, pressure, flow rate, was calculated from the steady state run data. Then the data in repeated tests for the same parametric study was used to obtain the experimental errors. All the liquid samples were collected during the nearly steadystate operation to determine the carbon content ($C_{CO_2}$) and alkalinity ($Alk_K$) for carbonate conversions calculation. The carbonate conversion can be calculated by Eq. (7):

$$\text{Conversion} = \frac{2C_{CO_2} - Alk_K}{Alk_K} \quad (7)$$

Results

Work was commenced by testing several solid additive types in initial lab experiments. The results in FIG. 3 show that in general, the addition of particles do enhance mass transfer in stirred reactor experiments. From these initial experiments, we identified activated carbon (AC) as the substrate that shows the greatest enhancement. It can be postulated that the hydrophobicity of AC allows for better particle dispersing and/or less of an increase in viscosity of the carbon capture solvent, as well as performing minimal chemical reactions within in the solvent. Furthermore, it has been identified that smaller AC particles show slightly better mass transfer enhancement over larger particles. We therefore selected 325 mesh AC particles for further experiments, as the smaller particle size should avoid process issues while avoiding the increased cost of nano-sized carbon.

The effect of activated carbon concentration on the $CO_2$ absorption rate was tested using the stirred reactor with a stable gas liquid interface. The results, as shown in FIG. 4, indicate that the $CO_2$ absorption rate increases with activated carbon concentration, but there is a diminishing return on % enhancement with increasing content of carbon particles. It means that the $CO_2$ absorption rate trends to be a constant when the particle concentration is too high. There is a diminishing return of enhancement, and when cost and process operation are taken into account then the optimal particles concentration is 1-2 wt %.

We were also interested in determining the total surface area of different sized (mesh) AC particle additives, when added at 1 wt %. It is hypothesized that the larger total surface area (smaller particles) will provide greater rate enhancement. We therefore calculated the total surface area (m2) present in stirred reactor experiments with a solvent volume of 75 mL, and a AC loading of 750 mg. It is expected that the increased enhancement will plateau off eventually as the diffusion resistance goes towards zero.

After identifying AC as the lead substrate for a solvent additive, we wanted to explore the option of pre-treating the carbon surface against degradation under the harsh conditions of a CCS process, mainly NOx gases that could put nitro groups on the surface. We oxidized the AC particles by two different methods, and found that oven oxidized particles maintain more activity of the parent particle (FIG. 5). The acid oxidation mimics degradation in the CCS process, which lowers the rate enhancement compared to the baseline particle. Pre-oxidation via thermal treatment provides a protective oxide layer preventing the formation of nitro groups and maintains the rate enhancement.

We then wanted to test the long-term thermal stability of these oven oxidized particles. A solution of MEA were charged with 1 wt % oven oxidized particles and placed in a 125° C. oven for 186 h. Stirred reactor testing of the resulting solution shows that there is some loss in rate enhancement compared to the baseline (FIG. 6). A few more experiments are needed to verify this result: filter the particles and run in fresh solvent, and run a blank solvent side by side to determine the effect of the thermal treatment on the baseline solvent. This will help determine if it is the particles that are losing effectiveness or if it is an artifact of the solvent. Regardless, the absolute rate is lower than the fresh solvent.

With a fundamental understanding of the properties of activated carbon particles in lab scale experiments, we conducted scale-up testing on the mini-scrubber apparatus. The mini scrubber apparatus approximates absorber-side conditions with random packing. The mini-scrubber absorption data in FIG. 7 shows that the addition of oven oxidized AC particles (red) significantly enhances $CO_2$ removal over the entire range, relative to the CAER-B3 baseline (blue). In addition, the incorporation of the CAER homogenous $CO_2$ hydration catalyst, C5c, further enhances mass transfer (purple), indicating that the two additives are either working by different mechanisms, or working in tandem to further enhance each other. An important lesson learned, is that the addition of solid particles to the capture solution can alleviate foaming issues that are common when homogenous catalyst is present in solution.

Bench unit studies were conducted to determine how the particle additives would perform under actual process conditions, and quantify overall enhancement (decrease) of the energy penalty for a CCS process. We conducted a series of bench unit experiments with flue-gas exposed CAERB3 from the pilot plant, in order to run under the most relevant conditions possible. This solvent was directly tested before a fresh 2.3 g/L of C5c catalyst was added. Then 1 wt % of oven oxidized AC particles was added, and a stepwise picture was obtained of the role for each additive (Table 1). The dual additive system, homogenous catalyst+activated carbon, shows ~25% decrease in energy penalty versus the MEA test case.

We sought to determine if we can alter the surface functionalization to increase the activity of AC particles. We synthesized a series of functionalized particles, with oxygen, amine, and catalyst surface functional groups. These particles have different relative activities (see FIG. 8), with the quaternary ammonium and zinc catalyst functionalized particles showing the greatest $CO_2$ removal rates. The obvious question raised from this data is what properties of these different functionalized particles lead to differences in relative activities. We therefore sought to characterize this series of particles by as many analytical methods as possible. The data collected thus far is summarized in Table 2, and we are still working on obtaining analysis we do not have the capabilities to do in-house.

Analysis of the data collected thus far, only shows a possible linear relationship between the zeta potential and $CO_2$ removal activity (FIG. 9). Further testing is necessary to test this theory and verify how far this relationship extends. It is hypothesized that the surface charge and surface acidity/basicity will be the properties that dictate the particle activity.

Work was able to show that the addition of nano-to-micro sized particles has the potential to effectively promote overall mass transfer of $CO_2$ into CCS solvents and reduce the overall energy penalty of the process. We began by screening a variety of solid media in the stirred-reactor apparatus, and determined that activated carbon (AC) particles showed the greatest mass transfer enhancement. We then tested three different sizes of AC particles, in order to determine the efficacy of smaller sized micro particles, and tested a range of particle loading (1-10 wt %). The smaller particles are not only more effective at promoting mass transfer, but we also postulate that the smaller particle size will cause fewer process issues upon process scale-up, especially at the lower loadings of 1-2 wt. % where the enhancement per unit is maximized.

With the conditions determined for our initial studies, we conducted several tests to determine the process stability of these AC particles. We conducted initial scale-up testing with oven oxidized AC particles, and mini-scrubber experiments showed that AC particles enhance mass transfer and effectively work in tandem with our homogenous $CO_2$ hydration catalyst (dualadditive system) to further enhance $CO_2$ absorption. Bench unit studies then showed that the overall energy penalty can be reduced with this dual-additive system by as much as 25%, relative to the MEA baseline case.

The foregoing descriptions of various embodiments provide illustration of the inventive concepts. The descriptions are not intended to be exhaustive or to limit the disclosed invention to the precise form disclosed. Modifications or variations are also possible in light of the above teachings. The embodiments described above were chosen to provide the best application to thereby enable one of ordinary skill in the art to utilize the inventions in various embodiments and with various modifications as are suited to the particular use contemplated. All such modifications and variations are within the scope of the invention. All publications, patents and patent applications referenced herein are to be each individually considered to be incorporated by reference in their entirety.

The invention claimed is:

1. A method for increasing carbon capture from a gas comprising:
functionalizing hydrophobic activated carbon-comprising particles by appending a —COOH functional group thereto, wherein the hydrophobic particles have a width of less than about 500 microns;
adding the hydrophobic particles with the appended —COOH functional group to a biphasic scrubbing solution;
contacting the gas with the biphasic scrubbing solution, wherein the biphasic scrubbing solution comprises an amine solvent; and
wherein the hydrophobic particles are further functionalized such that the hydrophobic particles comprise the structure

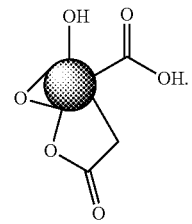

2. The method of claim 1, wherein the hydrophobic particles have a width of between about 0.1 and 500 microns.

3. The method of claim 1, wherein the hydrophobic particles have a width of less than 100 nanometers.

4. The method of claim 1, wherein the amine solvent is selected from the group consisting of monoethanolamine (MEA), hexanediamine (HDA), N,N-Bis(2-hydroxyethyl) methyl-amine (MDEA), piperazine (PZ) and 2-amino-2-methyl propanol (AMP).

5. The method of claim 1, wherein the hydrophobic particles comprise between about 0.5 to 2.5 percent by weight of the biphasic scrubbing solution.

6. The method of claim 1, wherein the amine solvent comprises an amine dissolved in water, wherein the amine comprises between about 15 to about 50 weight percent of the amine solvent.

7. The method of claim 1, wherein the amine solvent has a viscosity of between about 3 to about 10 cP.

8. The method of claim 1, wherein the hydrophobic particles are functionalized to increase positive zeta potential.

9. The method of claim 1, wherein the activated carbon particles are further functionalized to increase positive zeta potential.

10. The method of claim 9, wherein the activated carbon particles are further appended with a functional group selected from the group consisting of an alcohol, a primary amine, a tertiary amine, and an amino silane.

* * * * *